April 24, 1962  A. E. R. ARNOT  3,031,094
INDUSTRIAL TRUCKS
Filed May 15, 1959  4 Sheets-Sheet 2
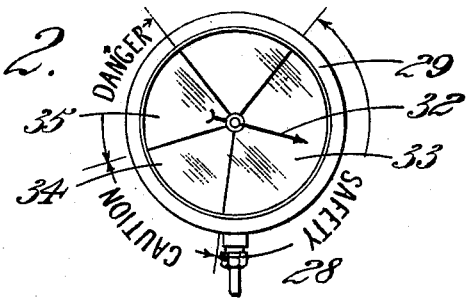
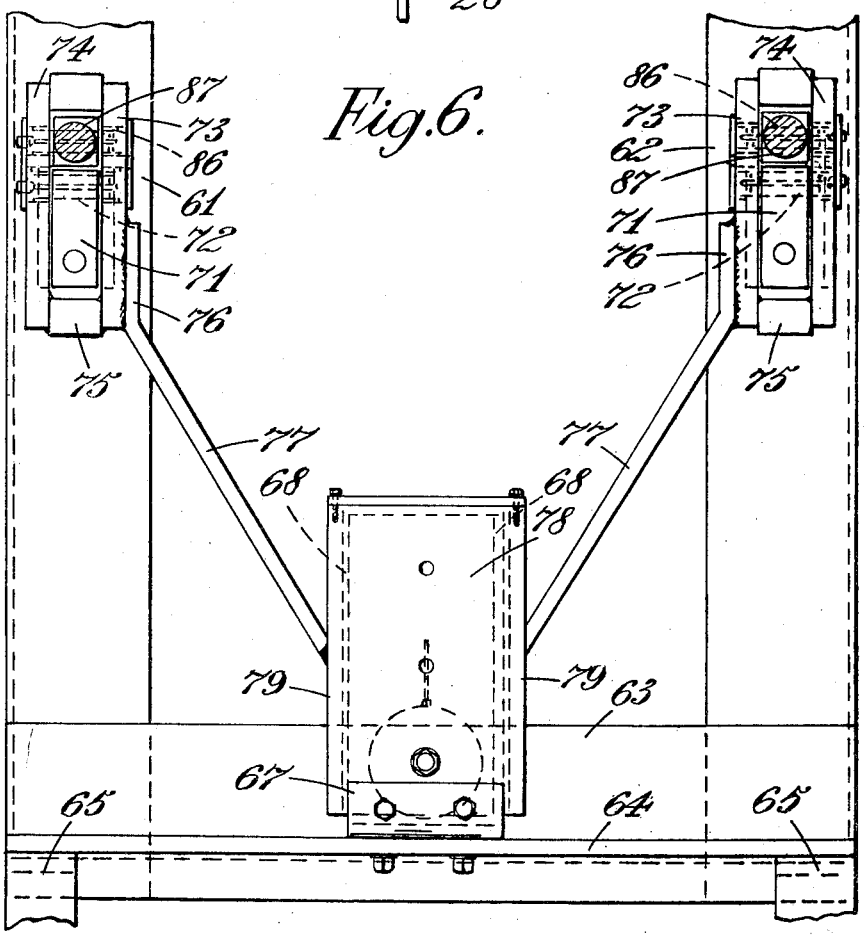
INVENTOR
Alfred E. R. Arnot
By Martin Kirkpatrick
ATTORNEY

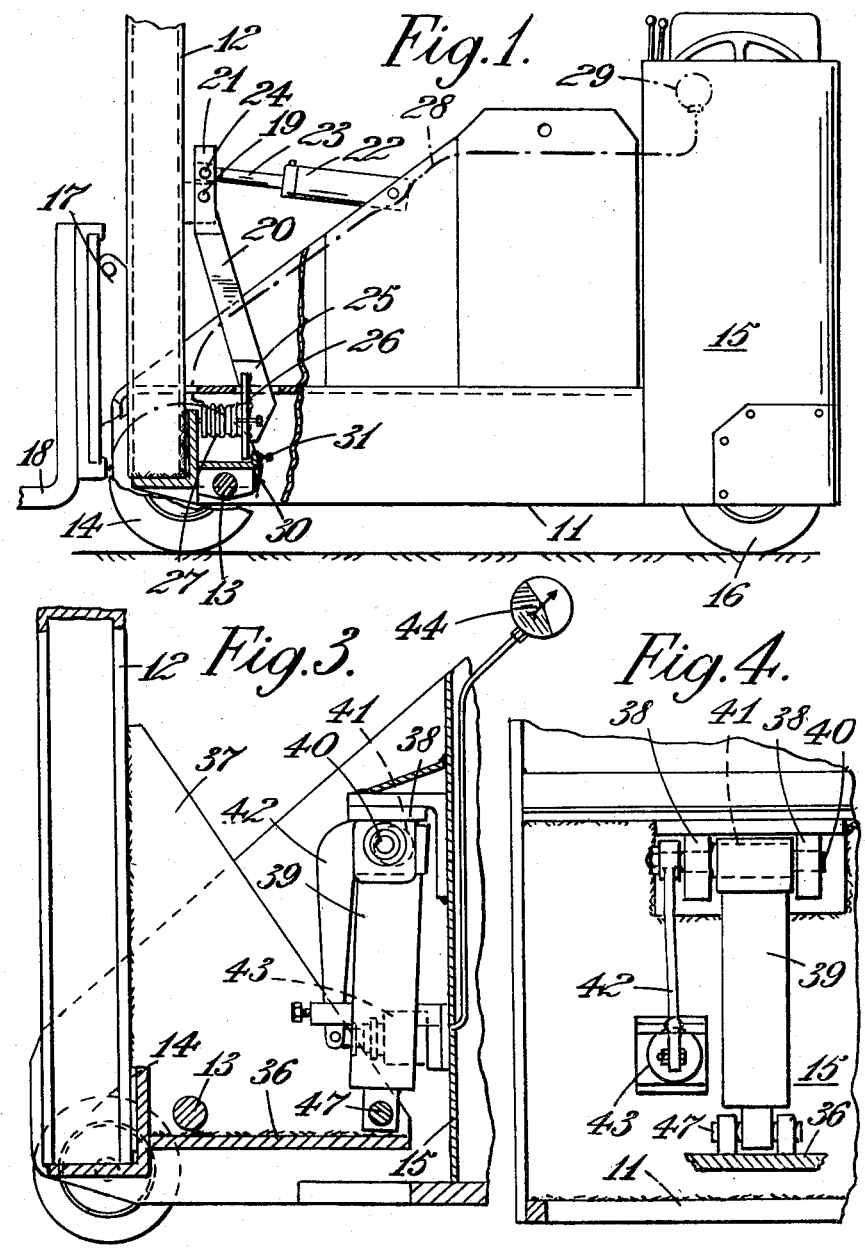

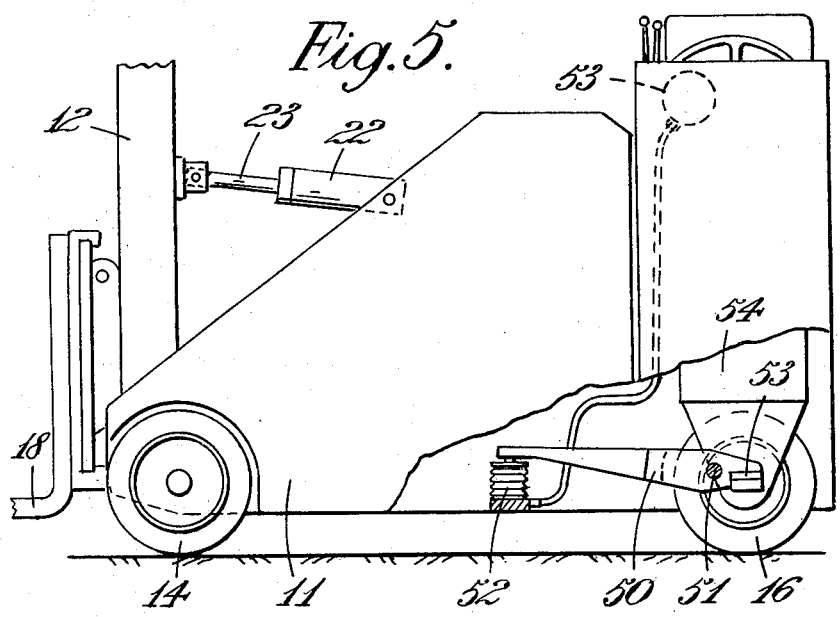
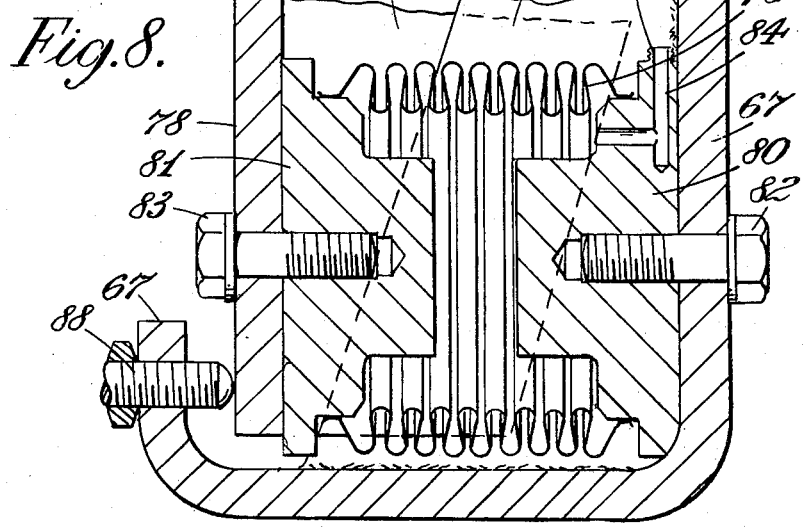

April 24, 1962  A. E. R. ARNOT  3,031,094
INDUSTRIAL TRUCKS

Filed May 15, 1959  4 Sheets-Sheet 4

INVENTOR
Alfred E. R. Arnot
BY Martin Kirkpatrick
ATTORNEY

United States Patent Office 3,031,094
Patented Apr. 24, 1962

3,031,094
INDUSTRIAL TRUCKS
Alfred Erwin Reginald Arnot, Basingstoke, England, assignor to Lansing Bagnall Limited, Basingstoke, England, a British company
Filed May 15, 1959, Ser. No. 813,395
Claims priority, application Great Britain May 16, 1958
2 Claims. (Cl. 214—674)

This invention comprises improvements in or relating to industrial trucks.

The invention relates to industrial trucks of the type having an overhung load-elevating carriage mounted on a guide (which may be a mast) for movement up and down, which guide can be tilted when desired. In such trucks the load exerts an overturning moment on the truck and the limiting load, beyond which there is a risk of overturning, varies with the angle of the guide to the vertical. It is highly desirable that the operator should have an indicator which shows when the limit of stability is reached, and that it should be accurate. Otherwise, in order to avoid risk, the indicator may need to be restricted unduly by a wide margin of safety, and the possibilities of the truck cannot be fully exploited.

In our prior British Patent No. 723,769 there is described a safe load indicator which depends on measurement of stress in the operating parts. It is an object of the present invention to provide such an indicator of improved performance and sensitiveness.

According to the present invention, in an industrial truck of the type described, there is provided a load capacity indicator comprising a device for measuring the reaction against tilting moment (or against the excess righting-moment of the truck) at the point where either of these moments is applied.

The means for measuring the reaction may comprise a lever pivoted so that the reaction is applied by the lever through the pivot, an arm forming part of the lever which applies force to a measuring element mounted on the part which carries the pivot, and an indicator operated by the measuring element.

In one form according to the invention the lever is pivoted upon the mast and measures the reaction of the force exerted by the mast at the pivot on the tilting jack which is connected to one end of the lever, while the means for measuring the reaction are connected to the other end of the lever.

In another form, the lever is pivoted to the frame which carries the tilting jack and to the rear end of the jack itself so that it measures the reaction of the force exerted by the jack. In this case, to ensure accuracy, care must be taken to apply the jack force in a direction at right angles to a line joining the pivot of the mast with the point of application of the jack force.

In a third form, the lever is so pivoted that it carries the weight on the back wheel of the truck which is attached to a point displaced from the pivot of the lever, while the measuring element is applied to the third point on the lever. In this case, the reaction on the lever of the weight carried on the rear wheel of the truck is measured and the stability limit is reached when the weight on the rear wheels approaches zero.

The following is a description by way of example of certain constructions in accordance with the invention:

Referring to the accompanying drawings,

FIGURE 1 is a side elevation of one construction in accordance with the invention;

FIGURE 2 is a detail of the dial of the indicator used with the construction shown in FIGURE 1;

FIGURE 3 is a vertical section through a second construction;

FIGURE 4 is a detail of the construction shown in FIGURE 3;

FIGURE 5 is a side elevation, partly broken away, of a third construction.

FIGURE 6 is a front elevation of the indicator mechanism of a further construction;

FIGURE 8 is a detail of part of the construction shown in FIGURES 6 and 7.

Figure 7:
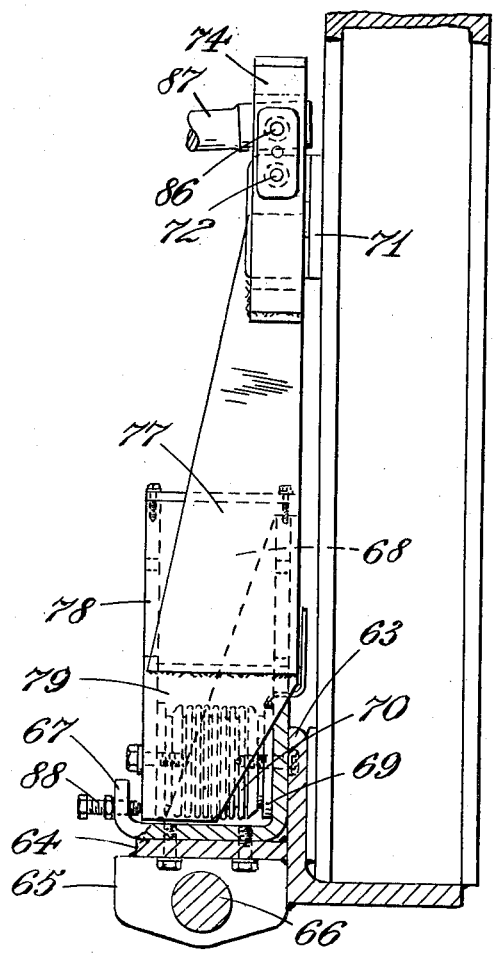
FIGURE 7 is a side elevation of the same.

Referring to the construction shown in FIGURES 1 and 2, a truck having a body 11 is provided which carries at its front end a mast 12 pivoted on the truck chassis at 13 close to the ground. The body 11 of the chassis extends rearwardly from the pivot point 13 (where it is supported by two ground wheels 14) to a heavy rear portion 15 which houses the operating gear of the truck and overlies a steerable rear wheel 16 or pair of wheels. On the mast 12 there is a rising and falling carriage 17 on which are mounted forwardly-projecting fork arms 18.

On the back of the mast there is pivoted at 19 a lever 20 which at its upper end by the pivot has two arms 21, one for each side of the mast and which is operated by two jacks 22, the rods 23 of which are pivoted to the lever arms 21 at 24 just above its pivot points 19 on the sides of the mast. The two lever arms 20 extend downwardly and converge until they join at 25 close behind the bottom of the mast. Here they carry a plate 26 and between the plate and the back of the mast there is interposed a pressure measuring device. This consists of an oil-filled bellows 27, the interior of which is connected by a pipe 28 (indicated in chain line) to a pressure gauge 29. Behind the lever 20 the mast carries a bracket 30 with a screw 31 to act as a back-stop. The effect of this arrangement is that the pressure-gauge 29 shows the reaction of the force exerted by the mast 12 on the pivot 19, irrespective of the angle at which the jacks 22 engage the mast, and as the bellows 27 are mounted on the mast 12 they indicate the reaction accurately at all degrees of tilt.

Referring to FIGURE 2 which shows the dial of the pressure-gauge 29, the pressure in the bellows is indicated by a pointer 32 and the dial is marked in certain sectors in different colours. For example, the safe range of pressures in which there is no danger of a load on the forks 18, which overhangs the wheels 14, tipping the truck forward, may be indicated by a green sector 33. As the load approaches the value which will tip the truck over, there is a yellow sector 34 and at the point when tipping over becomes imminent there is a red sector 35 to indicate danger.

In a second construction shown in FIGURES 3 and 4, the mast 12 has a rearwardly-extending lever arm 36 built up from a horizontal base and side gussets 37, which extends to the rear of its pivot almost as far as the main body portion 15 of the truck. Above the lever arm 36 on the main body there is a forwardly-projecting bracket 38 to support an operating jack 39. The operating jack extends downwardly from the bracket 38 at right angles to the lever arm 36. The jack is connected to the bracket 38 by a pivot 40 on the bracket which carries an eccentric portion 41 to act as a pivot-bearing for the jack. The pivot 40 is rigidly connected to a lever 42 which bends down beside the jack and bears at its lower end on an oil-filled bellows 43. The reaction of the force exerted by the jack on the eccentric 41, presses the lever against the bellows and operates an oil gauge 44. The jack engages the eccentric 41 by needle roller bearings 45. The jack rod 46 is pivoted to lever 36 at 47 at a position which makes the average angle of the jack rod with the lever arm as nearly a right angle as possible.

In a third form, shown in FIGURE 5, the rear wheel 16 of the truck is carried on the end of a lever 50 which is pivoted close to the rear wheel on the truck body at 51 and which extends forwardly to a bellows 52 connected to a pressure gauge 53. In this case the indicator 53 shows danger as the pressure in the bellows 52 approaches zero, corresponding to zero load on the back wheel. It will be understood that the lever 50 bears on a bracket 53 carried by the mounting 54 for the rear wheel 16 and that the wheel 16 may be power-driven and may be steerable relatively to the mounting 54, but the details of the drive mechanism and steering mechanism for the rear wheel do not in themselves form any part of the present invention. In marking the dial of the gauge 53 account can be taken of the weight of the mounting and the rear wheel itself. Normally the lever 50 would be forked to engage the mounting 54 and the two sides of the fork would be brought togther to form the portion which bears on the bellows 52.

In place of the bellows 27, 43 or 52, as the case may be, and pressure gauge, it may be preferred to provide a mechanical lever or gear multiplying system in which the tilt jack force or rear wheel reaction is balanced against the extension of a spring controlling a measuring indicator.

Referring now to the construction shown in FIGURES 6 to 8, this is in principle similar to that shown in FIGURES 1 and 2. In FIGURES 6 and 7 the body of the truck is not shown but only the two sides 61, 62 of the mast which has at its lower end a cross-member 63 in the form of an angle iron with a welded-on horizontal rib 64. On the underside of the rib 64 there are welded bearing brackets 65 for a round bar 66 which constitutes a pivot for the mast. In the centre of the rib 64 there is secured a bracket 67 formed out of a piece of flat metal bent to a J-shape and stiffened by triangular gussets 68. The bracket 67 carries at 69 the base of a bellows 70. On the back of the mast on each of the side members 61, 62, there is mounted a bracket 71 which affords a pivot bearing 72 for a pair of rockers 73, 74, which are united together by a spacer 75 welded between them at the bottom. The inner member 73 of the pairs of rockers 73, 74 has welded to it a flat bar 76 which extends downwardly and is bent so as to be inclined over the greater portion of its length, as shown at 77. The two inclined members 77, where they converge together at the bottom support between them and are welded to a rectangular casing 78 having sides 79 which lap over and enclose the gussets 68 of the J-shaped member 67 already referred to. In this way, the bellows 70 are totally enclosed and protected from damage.

The bellows 70 comprise a circumferentially corrugated thin metal portion, the ends of which are soldered to two sealed end blocks 80, 81, one of them secured to the J-shaped member 67 by setscrew 82 and the other secured to the box-like casing 78 by means of a setscrew 83 (see FIGURE 8). The base block 80 contains a passage 84 for the pressure liquids which is connected to a nipple 85 suitable to receive one end of a pipe leading to a pressure gauge, such as the gauge 29 of FIGURE 2.

Above the pivot 72 supported by the brackets 71, the side rockers 73, 74 carry pivots 86 with which are engaged the ends of jack rods 87, corresponding to the jack rods 23 of FIGURES 1 and 2.

The operation of this mechanism is similar to that of FIGURES 1 and 2, but it will be noted that the bellows are protected from damage by the casing 78. A backstop 88 is provided by a screw secured to the J-shaped bracket-member 67.

We claim:
1. In an industrial truck having a truck body, front and rear supporting wheels for the body, an upstanding guide pivoted on the truck body near the front wheels and a load elevating carriage mounted for movement up and down said guide and extending therefrom so as to overhang the front wheels, a stability indicator comprising in combination a jack to effect canting movement of said guide about its pivot on the truck body, and an indicator-operating lever pivotally connected to the upstanding guide, said jack being pivoted to said lever close to its pivotal connection to the guide, said lever having a multiplying arm extending from said two pivotal connections to the guide and jack, an hydraulic compressible chamber device located between said arm and said guide and engaged with said arm so as to be reacted on thereby when force is exerted by the load on the guide against the jack, and a pressure gauge hydraulically connected to the chamber to register pressure therein.

2. In an industrial truck having a truck body, front and rear supporting wheels for the body, an upstanding guide pivoted on the truck body near the front wheels and a load elevating carriage mounted for movement up and down said guide and extending therefrom so as to overhang the front wheels, a stability indicator comprising in combination a pivot on said guide and a pivot on said body, a jack extending therebetween but having interposed between itself and one of said pivots an indicator operating lever which engages one of said pivots and close thereto is engaged by the jack and which lever has a relatively long multiplying arm extending from said pivot, an hydraulic compressible chamber device engaged by said arm and reacted on thereby when force is exerted by the load on the guide against the jack, and a pressure gauge hydraulically connected to the chamber to measure pressure therein.

References Cited in the file of this patent

UNITED STATES PATENTS

| 2,362,129 | Gfrorer | Nov. 7, 1944 |
| 2,643,781 | Wise | June 30, 1953 |
| 2,704,132 | Marco | Mar. 15, 1955 |
| 2,767,394 | Arnot | Oct. 16, 1956 |

FOREIGN PATENTS

| 713,324 | Great Britain | Aug. 11, 1954 |